(12) United States Patent
Malshe et al.

(10) Patent No.: US 12,499,399 B1
(45) Date of Patent: Dec. 16, 2025

(54) ENHANCED BATCH COMPUTING ARCHITECTURE AND TECHNIQUES FOR CONSENSUS PLANNING FOR LARGE-SCALE SUPPLY CHAINS

(71) Applicant: Amazon Technologies, Inc., Seattle, WA (US)

(72) Inventors: Rohit Malshe, Kirkland, WA (US); Mahdieh Allahviranloo, New York, NY (US); Chinmoy Mohapatra, Lake Stevens, WA (US)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 18/212,306

(22) Filed: Jun. 21, 2023

(51) Int. Cl.
| | |
|---|---|
| *G06Q 10/0631* | (2023.01) |
| *G06Q 10/08* | (2024.01) |
| *G06Q 10/083* | (2024.01) |
| *G06Q 10/087* | (2023.01) |
| *H04L 67/12* | (2022.01) |

(52) U.S. Cl.
CPC ....... *G06Q 10/06315* (2013.01); *G06Q 10/08* (2013.01); *G06Q 10/083* (2013.01); *G06Q 10/087* (2013.01); *H04L 67/12* (2013.01)

(58) Field of Classification Search
CPC ............ G06Q 10/06315; G06Q 10/08; G06Q 10/083; G06Q 10/087; H04L 67/12
See application file for complete search history.

(56) References Cited

U.S. PATENT DOCUMENTS

| | | | |
|---|---|---|---|
| 6,560,501 B1* | 5/2003 | Walser | G06F 9/4887 |
| | | | 700/106 |
| 2003/0005023 A1* | 1/2003 | Gilbert | H04L 41/08 |
| | | | 709/217 |
| 2017/0006135 A1* | 1/2017 | Siebel | G06F 8/24 |

(Continued)

OTHER PUBLICATIONS

Han Zhang, Kai Li, Chengbin Chu, Zhao-hong Jia, "Parallel batch processing machines scheduling in cloud manufacturing for minimizing total service completion time", Computers & Operations Research, vol. 146, Oct. 2022 (https://www.sciencedirect.com/science/article/pii/S0305054822001617) (Year: 2022).*

*Primary Examiner* — Rupangini Singh
*Assistant Examiner* — Stephanie S. Wallick
(74) *Attorney, Agent, or Firm* — Eversheds Sutherland (US) LLP

(57) ABSTRACT

A method for supply chain consensus planning using batch computing architecture may include instantiating an instance in a network; based on the instantiation of the instance, writing computational codes of local coordinators from scalable object storage in the network to batch computing devices in the network; (i) executing the computational codes, independently from one another, using the batch computing devices; (ii) based on executing the computational codes, writing first public variables, by the local coordinators independently from one another, from the batch computing devices to the scalable object storage; (iii) identifying, by the instance, based on the first public variables, a first quantity for a time period; iteratively repeating steps (i)-(iii) with updated data from the local coordinators until identifying a convergence on a second quantity, and sending, by the instance, an indication of the convergence to the local coordinators.

20 Claims, 6 Drawing Sheets

(56) References Cited

U.S. PATENT DOCUMENTS

| | | | |
|---|---|---|---|
| 2017/0116566 A1* | 4/2017 | Walton | G06Q 10/087 |
| 2017/0351989 A1* | 12/2017 | Langdon | G06Q 10/06315 |
| 2019/0205857 A1* | 7/2019 | Bell | G06Q 10/08 |
| 2019/0294836 A1* | 9/2019 | Hegde | H04L 9/0643 |
| 2020/0364817 A1* | 11/2020 | Liu | G06F 16/27 |
| 2024/0265339 A1* | 8/2024 | Wang | G06Q 30/0202 |

\* cited by examiner

ENHANCED BATCH COMPUTING ARCHITECTURE AND TECHNIQUES FOR CONSENSUS PLANNING FOR LARGE-SCALE SUPPLY CHAINS

BACKGROUND

Large-scale supply chains may have many delivery stations. Software may be used to generate a consensus plan for an agreed-upon forecast of the number of units to be provided by the respective delivery stations in the supply chain. However, software-based solutions for supply chain consensus planning may have to aggregate computer code from agents of the delivery stations, which can be inefficient and may require agents to expose their computer code to allow consensus planning.

BRIEF DESCRIPTION OF THE DRAWINGS

To easily identify the discussion of any particular element or act, the most significant digit or digits in a reference number refer to the figure number in which that element is first introduced.

Figure 1:
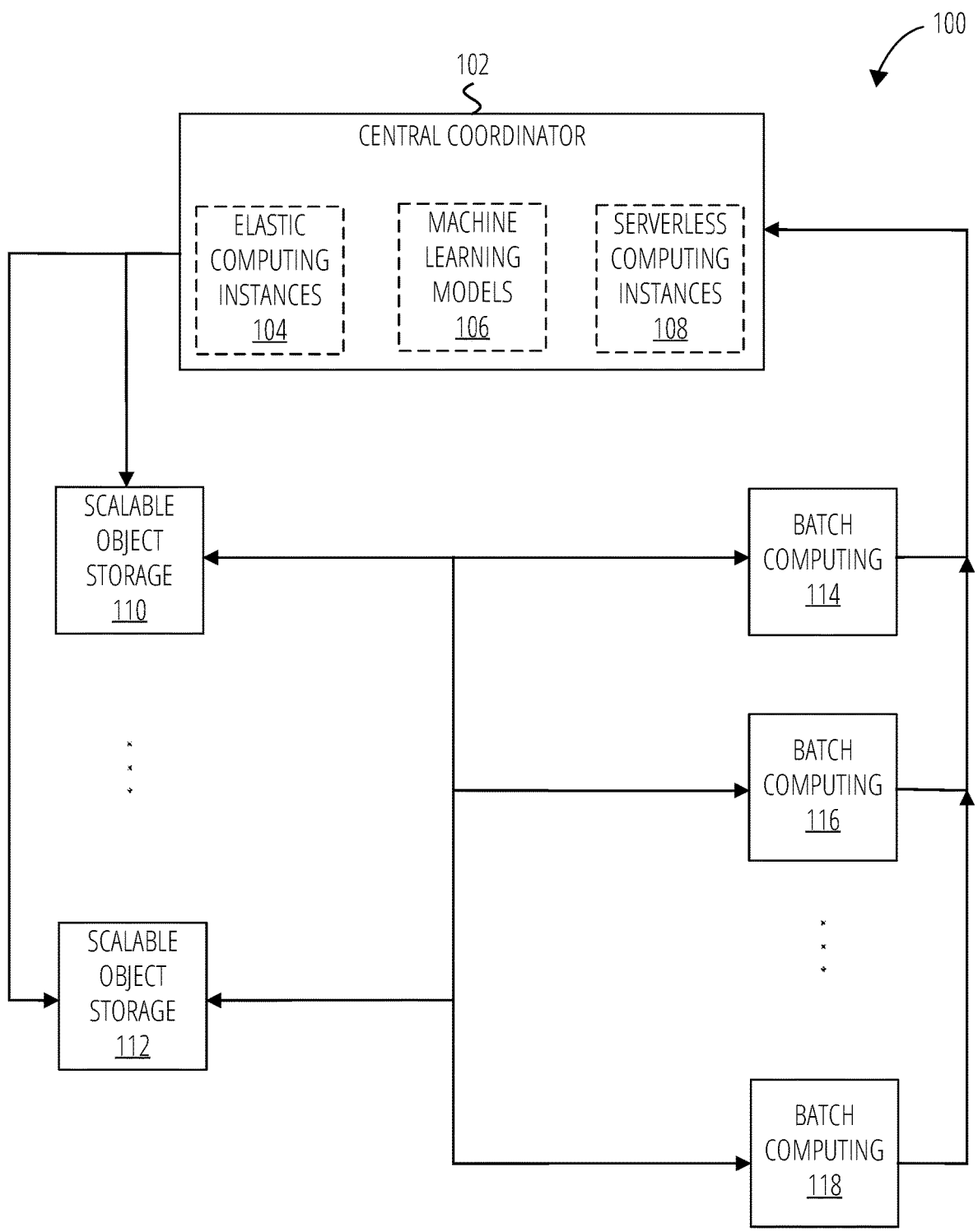
FIG. 1 illustrates an example batch computing architecture in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for using batch computing architecture and techniques to enhance supply chain consensus planning.

Batch computing allows for creating and running pipeline jobs periodically and on-demand in a cloud-based environment. Batch computing not only allows for creating and executing jobs with a user interface, but also allows for executing jobs using pre-built or pre-customized images (e.g., Docker images or other read-only templates including instructions for generating a container that may be run). Batch computing may allow for running batch computing workloads of any scale asynchronously across multiple servers, saving time from installing, administering, monitoring, and scaling batch computing processes. Running a pipeline job with batch computing may include submitting and running a task that uses a fetch and run image to download and execute a job script.

One application of batch computing that may provide technical enhancements is supply chain consensus planning. Supply chains have multiple locations, such as delivery and fulfillment stations, each with multiple agents: an under-the-roof operation capacity, a road capacity, and a station's mechanical capacity. In software-based consensus planning, respective agents of supply chain delivery stations may possess private information about their costs and constraints, which may help them solve their own optimization problem to achieve optimal capacity. The private information and optimization problems may be included in and used by the models and methods (e.g., computer code for demand and delivery capabilities forecasting) of the respective agents. Software-based consensus planning using multiple agents may include aggregating and using the respective computer code forecasting models of the agents. This aggregation and exposure of the code may be inefficient and less desirable in large-scale supply chain operations with many agents and their codes.

Enhanced batch computing architecture and techniques may remedy the need to aggregate and expose computer code from different locations in a large-scale supply chain while maintaining a software separation between the supply chain computer codes of the agents.

In one or more embodiments of the present disclosure, batch computing with elastic computing instances acting as a central coordinator for supply chain agents may facilitate consensus planning without supply chain agents having to provide and expose their code to the central controller. As a result, the codes of the agents do not need to be aggregated and executed together, and the central controller does not need to be aware of what problems the agents' codes are solving. The agents may maintain software separation in this manner so that the agents do not need to be aware of what the code of other agents is doing. In addition, distributed optimization problems, such as for consensus planning, may be solved using batch computing with an Alternative-direction Method of Moments (ADMM—which solves optimization problems by breaking them into smaller components).

In one or more embodiments, the central coordinator of the batch computing architecture may be one or more elastic cloud computing instances or one or more serverless, event-driven computing instances. The batch computing architecture may generate an agent (e.g., as a computer code) for a supply chain, and the computer codes of the agents may be stored in cloud-based object storage. For example, the agent code may define the object storage to which the agent code is to write, files to be copied, and a location (e.g., region). Upon launch, the central coordinator may publish the computer codes of the agents individually on batch computational machines using parallelization logic (e.g., one location per compute cluster). The agents may run independently and pull data from the cloud-based object storage, and may write to the cloud-based object storage independently. The central coordinator may remain synchronized with batch job profiles to identify when jobs are completed. Upon completion of all jobs within an iteration for consensus planning, the central coordinator may generate new jobs. The iterations may terminate either at a set counter or if a threshold condition is satisfied. To submit jobs in the batch computing architecture, a function of the central controller may submit jobs on a station-by-station basis using distributed computation, applying distribution at the level of a delivery station in the supply chain. The agents may be configured in a projects file a priori, so an iterator may be used for the consensus planning job submission to read configurations from the projects file.

In one or more embodiments, a monitoring function of the central controller may determine when the agents have finished running by pinging a batch service periodically to identify job status (e.g., submitting, runnable, starting, running). The central controller may read the agents again and run n iterations for the delivery stations in the supply chain, in which the delivery stations respond (e.g., with their forecasted delivery amount in a time period) for a respective iteration. Multiple iterations may be used to negotiate with the agents until all agents agree (e.g., the central controller identifies a convergence on the forecasted values of the agents). In this manner, rather than aggregating and running the codes from different agents to determine whether the agents may deliver a certain number of items, adjusting the number, and running the codes again until there is an agreement among the agents, the batch computing architecture reaches an agreement among the agents by iteratively interacting with them in parallel through price vectors, for example, to negotiate a consensus among the agents without exposing and running all of the agents' respective codes.

In one or more embodiments, the batch computing with ADMM consensus planning may provide a bi-level consensus plan ensuring agreement at the network level and the delivery station level. At the network level, the central coordinator may manage the messages passing between different stations and third-party carriers in a delivery network. In the lower level, any station may have its own coordinator (e.g., managing on the road, under the roof, grid capacity, and third-party carriers). When a new agent representing a third-party carrier is introduced to the model, the introduction may be at both levels. A modified cost function may be used to represent the cost realized by any agent in the network and for forecasts during a respective time period. Delivery stations may have overlapping jurisdictions that may be captured by batch computing with ADMM consensus planning.

In one or more embodiments, the batch computing with ADMM consensus planning may use a bottom-up approach. Using delivery stations as a unit of analysis, the consensus planning framework may be built among four agents (or another number) in any delivery station jurisdiction, which may generate an allocated volume and a third-party for respective delivery stations. Depending on the role of a given delivery station, whether it is located in an overlapping jurisdiction or just serves a single jurisdiction, the transaction of information across delivery stations can be different. For example, a delivery station may serve some of the volume allocated to a different jurisdiction, if needed. The total sum of volumes allocated to third parties at the station level may determine the total volume for the third-party carrier at the network level. Any delivery station may send a set of public variables to the central coordinator; in the case of stations in overlapping jurisdictions, the relevant public variables may be sent to the other connected stations as well. Once the central coordinator receives all inputs from the delivery stations, the upper-level consensus planning model may be executed to update the volumes and the third-party carrier.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example batch computing architecture 100 in accordance with one or more embodiments of the present disclosure.

Referring to FIG. 1, the architecture 100 may be a cloud-based computing architecture capable of performing ADMM using scalable batch computing. The architecture 100 may include a central coordinator 102, which may represent elastic computing instances 104, machine learning models 106, and/or serverless computing instances 108 (e.g., event-driven instances). When launched, the central coordinator 102 may publish computational codes for respective delivery station agents from scalable object storage (e.g., scalable object storage 110, scalable object storage 112) individually on batch computational machines (e.g., batch computing 114, batch computing 116, batch computing 118) using a parallelization logic (e.g., one city or other geographic region per compute cluster). The agent computational codes may run independently using the architecture 100, and may retrieve data from the scalable object storage. The agent computational codes also may write to the scalable object storage independently. The central coordinator 102 may remain in sync with batch computing job profiles to detect with the batch computing jobs of the batch computing 114, the batch computing 116, and/or the batch computing 118 have completed. Upon completion of the batch computing jobs in an iteration, the central coordinator 102 may spawn new batch computing jobs. The iterations may terminate either at a set counter or when a threshold condition is met (e.g., a convergence of deliveries of the agents).

In one or more embodiments, generating the agents may refer to generating computer scripts for a respective agent participating in ADMM. Below is an example code for creation and deployment of an agent:

```
import os
os.environ['DEFAULT_REGION']='us-east-1'
MY_EXECUTION_ROLE='arn:xyz:iam::
    01234567890':role/service-role/MachineLearning-Ex-
    ecutionRole-01234567890'
role=MY_EXECUTION_ROLE
region='us-east-1'
def write_to_ObjectStorage (fobj, bucket, key):
    ObjectStorage_client=SDK.client ("storage")
    print (f'Published file: {bucket}/{key}')
    return   (SDK.Session(region_name=region).resource
        ("storage").Bucket(bucket).Object(key).upload_fi-
        leobj(fobj))
def  publish_file_to_ObjectStorage(bucket,  folder_in_
    bucket,
    ObjectStorage_file_to_be_copied, file_to_be_copied):
    ObjectStorage_client=SDK.client("storage")
    key=f'{folder_in_bucket}/
        {ObjectStorage_file_to_be_copied}'
    write_to_ObjectStorage(file_to_be_copied,   bucket,
        key)
for each_agent in ['agent_1', 'agent_2', 'agent_3']:
    FILE_TO_BE_COPIED=open (f'{each_agent}', "rb")
```

```
BUCKET='ObjectStorage-shared-files'
FOLDER='codes/generic'
ObjectStorage_FILE_COPIED=f'{each_agent}'
publish_file_to_ObjectStorage(BUCKET,
    FOLDER,
    ObjectStorage_FILE_COPIED,
    FILE_TO_BE_COPIED).
```

The architecture 100 then may use a function to submit batch jobs. The function may be constructed to submit batch jobs station-by-station using a distributed computation, so the distribution may be at a level of a delivery station. Example code is below:

```
def submit_batch_job_individual_stations(
    job_name,
    job_queue_name,
    job_definition_name,
    job_code_location,
    #This order should be consistent with generic code.
    #generic_code ObjectStorage://ObjectStorage-shared-
        files/ml_model_housing/input_data/'ObjectStor-
        age://' OPTIMIZER NO station_code target station-
        s_or_zips,
    ObjectStorage_input_location,
    ObjectStorage_output_output,
    mode,
    hyper_param_tuning,
    split_method,
    target_column):
for individual_station_or_zip in stations_or_zips:
    #print      (f'Preparing    Jobs     for:
        {individual_station_or_zip}')
    #print (f"The ObjectStorage_input_location is:
        {ObjectStorage_input_location}") #print (f"The
        ObjectStorage_output_output           is:
        {ObjectStorage3_output_output}")
    ObjectStorage
    #print (f"The mode is: {mode}")
    #print (f"The hyper_param_tuning is: {hyper_param_
        tuning}")
    #print (f"The split_method is: {split_method}")
    #print (f"The target column is: {target_column}")
    response=batchcli.submit_job(
        jobName=job_name+str(individual_station_or_zip),
        jobQueue=job_queue_name,
        jobDefinition=job_definition_name,
        containerOverrides={
            'command': [
                "command",
                #This order should be consistent with generic code.
                #station_name,
                #ObjectStorage_input_location,
                #ObjectStorage_output_output,
                #mode,
                #hyper_param_tuning,
                #split_method
                individual_station_or_zip,
                ObjectStorage_input_location,
                ObjectStorage_output_output,
                mode,
                hyper_param_tuning,
                split_method,
                target_column
            ],
            'environment': [{
                "name": "BATCH_FILE_ObjectStorage_URL",
                "value": job_code_location
            }]
        })
    print        (f'Submitted       Jobs       for:
        {individual_station_or_zip}')
    print (f'---------------------------------------------')
```

In one or more embodiments, the central coordinator 102 may use an iterator for consensus planning job submissions. The iterator may read configurations from a projects file in which the agents may be configured a priori. Example iterator code may be as follows:

```
projects=pd.read_csv('AGENT_DETAILS.csv')
def run_concensus_planning_iteration (iter_number):
    #print (projects.columns.values)
    SUBMIT_BATCH_JOBS=1
    PRINT_FILE_VALUES=1
    #print('-----------------------------------')
    for items in range (len (projects)):
        if PRINT_FILE_VALUES==1:
            print('Agent details:')
            print('-----------------------------------')
            print(projects['job_definition_name'][items])
            print(projects['job_queue_name'][items])
            print(projects['job_name'][items])
            print(projects['job_code_location'][items])
            #print (projects['s3_input_location'][items])
            #print     (projects['ObjectStorage_output_output']
                [items])
            #print (projects['mode'][items])
            #print (projects['hyper_param_tuning'][items])
            #print(projects['split_method'][items])
            #print (projects['target_column'][items])
            print('-----------------------------------')
        else:
            pass
        job_definition_name=projects['job_definition_name']
            [items]
        job_queue_name=projects['job_queue_name'][items]
        job_name=projects['job_name'][items]
        job_code_location=projects['job_code_location']
            [items]
        ObjectStorage_input_location=projects
            ['s3_input_location'][items]
        ObjectStorage_output_output=projects['ObjectStora-
            ge_output_output'][items]
        mode=projects['mode'][items]
        hyper_param_tuning=projects['hyper_param_tuning']
            [items]
        split_method=projects['split_method'][items]
        target_column=projects['target_column'][items]
        import wrangler as wr
        import pandas as pd
        from datetime import datetime
        df=wr.ObjectStorage.read_csv
            (f"{s3_input_location}")
        column_to_split=split_method
        print ('We are submitting jobs for individual:')
        print (column_to_split)
        print (
            'That is, for each of these items the agent specified
                just now will be sent to one computer'
        )
        print('-----------------------------------')
        #Derive the stations on which to parallelize.
        if split_method=='station_code':
            stations_or_zips=list (set(df[split_method]))
            pass
        elif split_method=='zip_code':
            stations_or_zips=['ALL']
```

```
else:
    stations_or_zips=['ALL']
    print(stations_or_zips)
print('----------------------------------')
if SUBMIT_BATCH_JOBS==1:
    #This function gets a list from us in terms of stations_or_zips and submits jobs to Batch.
    submit_batch_job_individual_stations(
        job_name,
        job_queue_name,
        job_definition_name,
        job_code_location,
        #This order should be consistent with generic code.
```

```
        stations_or_zips,
        ObjectStorage_input_location,
        ObjectStorage_output_output, mode,
        hyper_param_tuning,
        split_method,
        target_column)
else:
    pass
```

In one or more embodiments, to determine when agents have finished running, the central coordinator 102 may use a monitoring function, which may use a batch client and ping the batch client periodically to confirm whether a job has been finished. Example code for the monitoring function is below:

```
def monitor_batch_jobs(
    job_queue_name,
    job_set_filter,
    job_status_filter=['SUBMITTED', 'RUNNABLE', 'STARTING', 'RUNNING'],
    sample_rate_sec=2,
    timeout=3):
    #Monitor a set of Batch jobs with common features.
    batchcli = SDK.client('batch')
    job_set_filter_list = job_set_filter
    if job_set_filter_list is not list:
        #if the set has one item - convert to list.
        job_set_filter_list = [job_set_filter]
    def get_list_of_remaining_jobs(queue_name='generic-ml'):
        # Code executed here
        job_status_df = pd.DataFrame( )
        first_run = True
        nextToken = 'something'
        while nextToken:
            if first_run:
                response_running = batchcli.list_jobs(jobQueue=queue_name,
                    filters=[{
                        'name':
                        'JOB_NAME',
                        'values':
                        [job_set_filter]
                    }])
                job_status_df = job_status_df.append(
                    pd.DataFrame(response_running['jobSummaryList']))
                first_run = False
                try:
                    nextToken = response_running['nextToken']
                except:
                    nextToken = None
            else:
                if nextToken:
                    response_running = batchcli.list_jobs(jobQueue=queue_name,
                        filters=[{
                            'name':
                            'JOB_NAME',
                            'values':
                            [job_set_filter]
                        }],
                        nextToken=nextToken)
                    try:
                        nextToken = response_running['nextToken']
                    except:
                        nextToken = None
                    job_status_df = job_status_df.append(
                        pd.DataFrame(response_running['jobSummaryList']))
            job_status_df = job_status_df.groupby(
                'status').count( )['jobId'].reset_index( )
            num_jobs_running = job_status_df[job_status_df.status.isin(
                job_status_filter)].jobId.sum( )
            num_jobs_total = job_status_df.jobId.sum( )
            return job_status_df, num_jobs_running, num_jobs_total
    job_status_df, num_jobs_running, num_jobs_total = get_list_of_remaining_jobs(
    )
    start_time = timeit.default_timer( )
    elapsed_time = 0
    # monitor as long as the number of jobs is positive and the elapsed time is below the timeout.
    print('Job Statuses:', job_status_df.values.flatten( ), ' Jobs Total: ',
        str(num_jobs_running))
```

```
     while num_jobs_running > 0 and elapsed_time <= timeout:
        # update the elapsed time in seconds
        elapsed_time = (timeit.default_timer( ) - start_time)
        # retrieve set of remaining jobs and number of remaining jobs.
        job_status_df, num_jobs_running, num_jobs_total = get_list_of_remaining_jobs(
        )
        # print time passed in minutes and seconds, number of jobs in each whitelisted status,
total number of jobs .
        print('Time Check ', str(int(elapsed_time / 60)), ' minutes, ',
            str(int(elapsed_time % 60)), ' seconds, Job Statuses:',
            job_status_df.values.flatten( ), ' Jobs Total: ',
            str(num_jobs_total))
        sleep for the requested smaple rate in seconds.
        time.sleep(sample_rate_sec)
    # notify if timedout.
    if elapsed_time > timeout:
        print('Monitoring timed out')
    # notify if completed.
    if num_jobs_running == 0:
        print('Monitoring complete')
    return job_status_df
```

In one or more embodiments, the central coordinator 102 may read the agents again and run iterations. The job in the example code below is supposed to submit the agents for an iteration for the stations:

```
ITERATION_COUNT=5
monitor_jobs=True
PRINT_FILE_VALUES=1
projects=pd.read_csv('AGENT_DETAILS.csv')
for iter_number in range (ITERATION_COUNT):
    print
        (f'###########################################
        #####################')
    print(f'RUNNING ITERATION {iter_number} OF
        CONSENSUS PLANNING')
    print
        (f'###########################################
        #####################')
    print ('')
    run_concensus_planning_iteration (iter_number)
    print(1) # here is where CPP loop works instead of
        printing (1). For demonstration purposes, we have
        taken out CPP loop.
    if monitor_jobs:
        for items in range (len (projects)):
            if PRINT_FILE_VALUES==1:
                import pandas as pd
                projects=pd.read_csv ('AGENT_DE-
                    TAILS.csv')
                print
                    ((f'###########################################
                    #########################')
                print (f'MONITORING ALL THE JOBS FOR
                    ALL THE AGENT {items+1} IN ITERATION
                    {iter_number} OF CONSENSUS PLAN-
                    NING')
                print
                    ((f'###########################################
                    #########################')
                print ('Agent details:')
                print ('-----------------------------------')
                #print (projects['job_definition_name'][items])
                #print (projects['job_queue_name'][items])
                print (projects['job_name'][items])
                #print (projects['job_code_location'][items])
                #print   (projects['ObjectStorage_input_loca-
                    tion'][items])
                #print   (projects['ObjectStorage_output_out-
                    put'][items])
                #print (projects['mode'][items])
                #print (projects['hyper_param_tuning'][items])
                #print (projects['split_method'][items])
                #print (projects['target_column'][items])
                print ('-----------------------------------')
                job_definition_name=projects['job_definition_
                    name'][items]
                job_queue_name=projects['job_queue_name']
                    [items]
                job_name=projects['job_name'][items]
                job_code_location=projects['job_code_loca-
                    tion'][items]
                ObjectStorage_input_location
                projects['ObjectStorage_input_location']
                    [items]
                ObjectStorage_output_output
                projects['ObjectStorage_output_output']
                    [items]
                mode=projects['mode'][items]
                hyper_param_tuning=projects['hyper_param_
                    tuning'][items]
                split_method=projects['split_method'][items]
                target_column=projects['target_column']
                    [items]
            else:
                pass
            job_status_df=monitor_batch_jobs(
                job_queue_name='amzlrs-malshe-generic-ml',
                job_set_filter=f'{job_name}'+'*',
                job_status_filter=['SUBMITTED',   'RUN-
                    NABLE', 'STARTING', 'RUNNING'],
                sample_rate_see=30,
                timeout=60*60)
            print (f'{job_name}')
```

Figure 2:
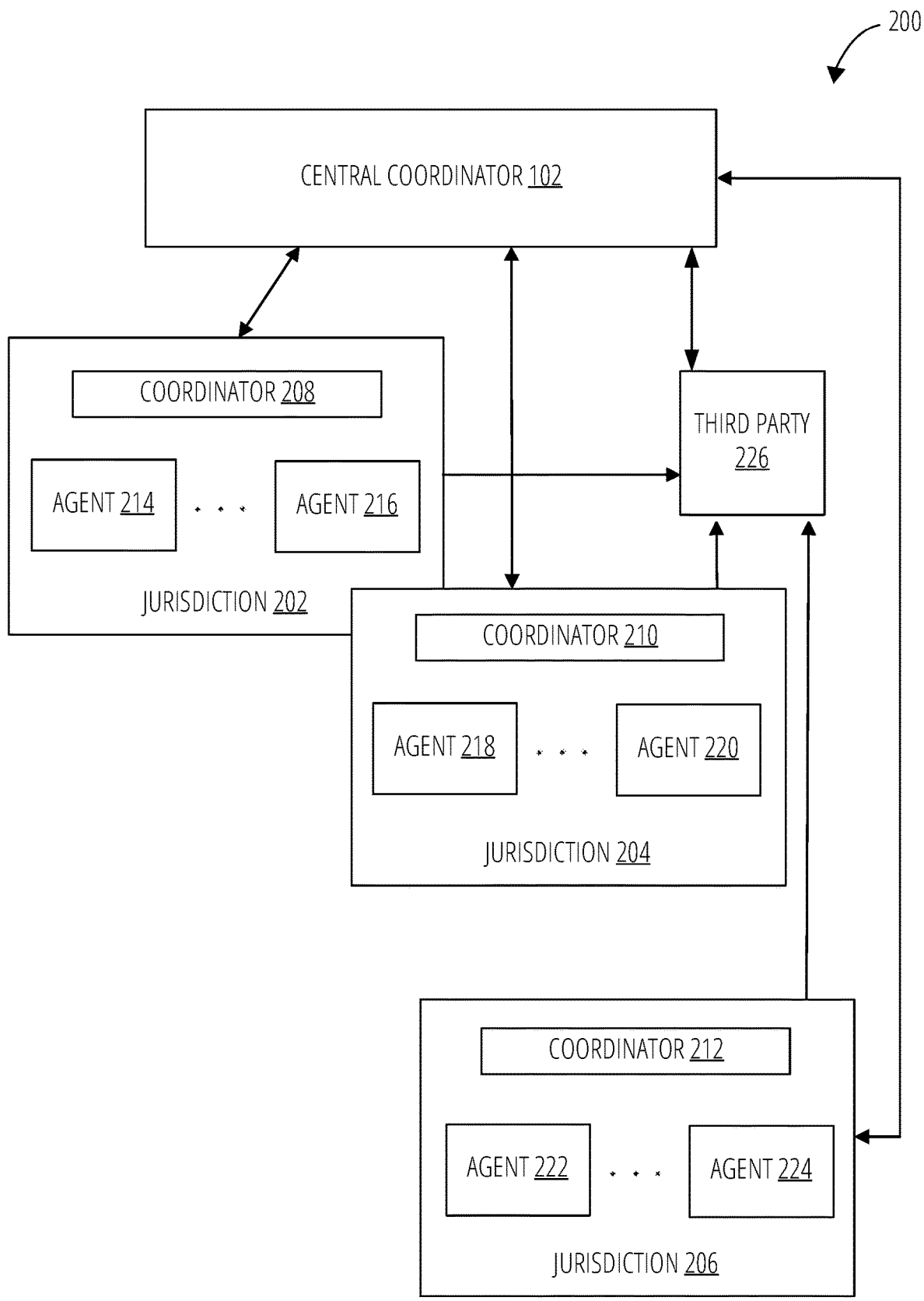
FIG. 2 illustrates an example hierarchical consensus planning structure in accordance with one or more embodiments of the present disclosure.

FIG. 2 illustrates an example hierarchical consensus planning structure 200 in accordance with one or more embodiments of the present disclosure.

Referring to FIG. 2, the structure 200 may represent a bi-level consensus planning structure for which consensus planning may be achieved using the architecture 100 of FIG. 1. The structure 200 may include the central coordinator 102 of FIG. 1 for consensus planning between multiple jurisdictions (e.g., geographic regions such as jurisdiction 202, jurisdiction 204, and 206, one or more of which may overlap geographically). The respective jurisdictions may include their own coordinator (e.g., coordinator 208 for jurisdiction 202, coordinator 210 for jurisdiction 204, coordinator 212 for jurisdiction 206). The coordinators of a jurisdiction may aggregate and run the code from agents of the jurisdiction (e.g., agent 214, agent 216 of jurisdiction 202; agent 218, agent 220 of jurisdiction 204, agent 222, agent 224 of jurisdiction 206). For example, a respective jurisdiction may include four agents: under the roof, over the road, grid, and a third-party agent logistic.

In one or more embodiments, to resolve the consensus planning problem for the agents of structure 200, the central coordinator 102 may use delivery stations as the unit of analysis by building the consensus planning framework among the agents of the different delivery station jurisdictions. As a result, the consensus planning may generate an allocated delivery volume, including for a third-party 226, in the structure 200. As shown in FIG. 2, the total sum of volumes allocated to third parties at the station level may determine the total volume for the third-party 226 at the network level. Any delivery station jurisdiction may send a set of public variables to the central coordinator 102; in the case of stations in overlapping jurisdictions, the relevant public variables may be sent to the other connected stations as well. Once the central coordinator 102 receives all inputs from the delivery stations, the upper-level consensus planning model may be executed to update the volumes allocated to the delivery stations and the third-party 226.

The network level consensus planning is described further below with respect to FIG. 3, along with the network level consensus planning model used by the central coordinator 102 to reach consensus using the architecture 100 of FIG. 1.

Figure 3:
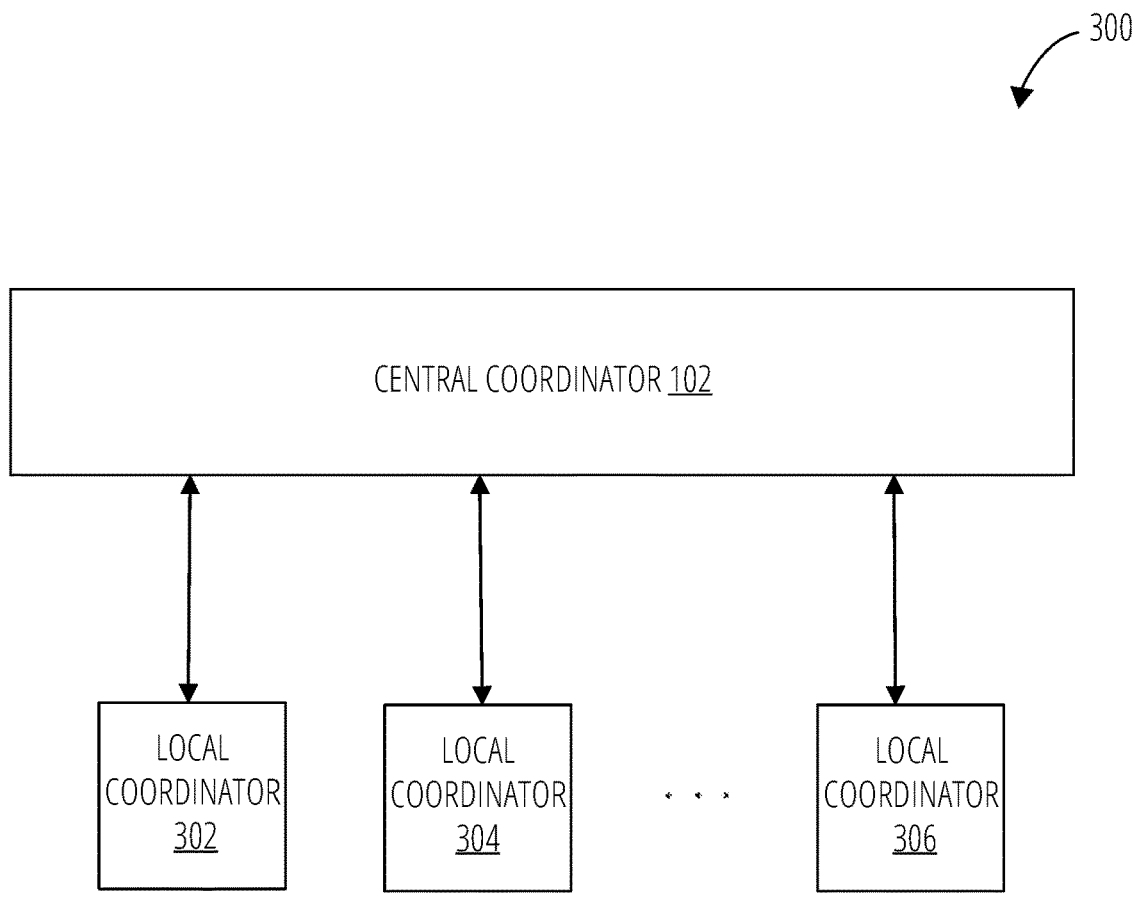
FIG. 3 illustrates an example network level consensus planning structure in accordance with one or more embodiments of the present disclosure.

FIG. 3 illustrates an example network level consensus planning structure 300 in accordance with one or more embodiments of the present disclosure.

Referring to FIG. 3, multiple local coordinators (e.g., stations, sub-agents, etc.) may provide their models and consensus values to the central coordinator 102.

Referring to FIG. 2 and FIG. 3, in one or more embodiments, the network level consensus planning model used by the central coordinator 102 may be represented by:

$$\min_{\mathbb{V},\mathbb{Y}} \sum_{i=1}^{N} \sum_{t=1}^{T} F_{i,t}(\mathbb{V}, \mathbb{Y}) \text{ where:}$$

$$\sum_{i=1}^{N} (V_i^t + V_{A4,i}^t) = V_{net}^t, \forall t \in \{1, \ldots, T\}$$

$$\sum_{i=1}^{N} V_i^t + V_a^t, \forall t \in \{1, \ldots, T\}$$

$$\sum_{i=1}^{N} V_{A4,i}^t = V_{A4}^t, \forall t \in \{1, \ldots, T\}$$

$$V_i^t, V_{A4,i}^t \in \mathbb{Z}^+ \text{ where:}$$

N is the total number of local coordinators in the structure 200, T is the planning horizon time, F represents a cost function for a local coordinator i at time t, $\mathbb{V}$ is a matrix of decision variables at the local coordinator level representing a total volume allocated to local coordinator i at time t, $\mathbb{Y}$ is a matrix of private decision variables used in the formulation of the local coordinators at time t, $$V_{net}^t$$

is the network level volume forecast value at time t, $$V_a^t$$

is the volume that has to be delivered across all local coordinator at time t, and $$V_{A4}^t$$

represents the total volume that a third-party carrier delivers across all the local coordinators at time t. The objective function minimizes the total cost of delivery operations at the network level. The constraint $$\sum_{i=1}^{N} (V_i^t + V_{A4,i}^t) = V_{net}^t, \forall t \in \{1, \ldots, T\}$$

ensures the sum of volumes delivered by the delivery stations and third parties equals the total volume at the network level. Constraints $$\sum_{i=1}^{N} V_i^t = V_a^t, \forall t \in \{1, \ldots, T\} \text{ and } \sum_{i=1}^{N} V_{A4,i}^t = V_{A4}^t, \forall t \in \{1, \ldots, T\}$$

refer to the sum of deliveries by the delivery stations and third parties across all of the local coordinators being equal to the corresponding values at the network level.

At the lower local coordinator level, an example using four agents A1, A2, A3, and A4 is shown below. A1 may represent an under the roof operations agent in a local coordinator. A2 may represent an on the road agent in the local coordinator. A3 may represent a mechanical capacity operations agent in the local coordinator. A4 may represent a third-party carrier agent in the local coordinator. The objective of the station level is to identify a consensus plan that minimizes the total cost incurred by the local coordinators:

$$\min_{v,y} \sum_{i=1}^{4} f_i(v_s^t, y_i^t),$$

such that:

$$v_1^t = v_2^t = v_3^t = v_c^t, \forall t \in \{1, \ldots, T\}, v_{A4}^t + v_c^t = v_{st}^t,$$

$$\forall t \in \{1, \ldots, T\}, \text{ and } v_i^t, v_c^t, v_{A4}^t \in \mathbb{Z}^+, \forall t \in \{1, \ldots, T\}.$$

In this formulation, $$v_1^t, v_2^t, \text{ and } v_3^t$$

are volumes that may be achieved by under the roof, on the road, and grid capacity agents of a local coordinator, respectively, at time t.

$$v_c^t$$

may represent the allocated volume to the third-party carrier.

$$v_{st}^t$$

may represent the total volume allocated to a local coordinator, equaling the sum of the volume delivered by the agents of the local coordinator.

$$v_{A4}^t$$

may represent the allocated delivery volume to the third-party 226. The respective agents A1-A4 may use a vector of private variables represented by $$y_1^t, y_2^t, y_3^t, y_{A4}^t.$$

The Lagrangian of $$\min_{v,y} \sum_{i=1}^{4} f_i(v_i^t, y_i^t)$$

may be as follows:

$$L[v^t, y^t, \lambda^t, \gamma^t] = \sum_{i=1}^{4} L_i(v_i^t, y_i^t, \lambda^t, \gamma^t) =$$

$$\sum_{i=1}^{4} f_i^t(v_i^t, y_i^t) + \sum_{i=1}^{3} \lambda_i^t(v_i^t - v_c^t) + \gamma^t(v_{A4}^t + \min\{v_1^t, v_2^t, v_3^t\} - v_{st}^t).$$

The augmented Lagrangian may be:

$$L_{\rho,\alpha}[v^t, y^t, \lambda^t, \gamma^t] = \sum_{i=1}^{4} f_i^t(v_i^t, y_i^t) + \sum_{i=1}^{3} \lambda_i^t(v_i^t - v_c^t) + \lambda^t(v_{A4}^t +$$

$$\min\{v_1^t, v_2^t, v_3^t\} - v_{st}^t) + \sum_{i=1}^{3} \frac{\rho}{2}\|v_i^t - v_c^t\|_2^2 + \frac{\alpha}{2}\|v_{A4}^t + \min\{v_1^t, v_2^t, v_3^t\} - v_{et}^t\|_2^2.$$

At the consensus, $$v_1^t = v_2^t = v_3^t = v_c^t = \min\{v_1^t, v_2^t, v_3^t\},$$

and the values of $$\frac{\rho}{2}\|v_i^t - v_c^t\|_2^2 \text{ and } \frac{\alpha}{2}\|v_{A4}^t + \min\{v_1^t, v_2^t, v_3^t\} - v_{st}^t\|_2^2$$

may be zero, meaning that the solution to the augmented Lagrangian may be equivalent to the Lagrangian solution.

In one or more embodiments, the iterations of the central coordinator 102 may be derived by the derivative of the augmented Lagrangian with respect to the variables. At any iteration k:

$$v_i^{K=1,t} = \operatorname{argmin}_{v_i^t} L_{\rho,\alpha}[v_i^t, v_c^{k,t}, \lambda^{k,t}, \lambda^{k,t}],$$

$$v_c^{k+1,t} = \operatorname{argmin}_{v_c^t} L_{\rho,\alpha}[v_i^{k+1}, v_c^t, \lambda^{k,t}, \lambda^{k,t}], \lambda_i^{k+1,t} = \lambda_i^{k,t} + \rho(v_i^{k+1,t} - v_c^{k+1,t}),$$

and augmented Lagrangian $$\gamma^{k+1,t} = \gamma^{k,t} + \alpha(v_4^{k+1,t} + v_c^{k+1,t} - v_{si}^t).$$

Given the augmented Lagrangian, the update for $$v_c^t$$

is as follows:

$$v_c^{k+1,t} = \frac{\sum_i^3 \lambda_i^{k,t} + \rho \sum_i^3 v_i^{k+1,t} - \gamma^{k,t} - \alpha v_4^{k+1,t} + \alpha v_{st}^t}{3\rho + \alpha}.$$

Agents 1, 2, and 3 may be the agents who should reach consensus in their planned delivery volume. The overflow of the volume exceeding the consensus volume may be sent to agent A4 (e.g., the third-party 226). The respective agents may have their own cost functions because the labor and operational costs for under the roof, over the roof, and grid may be different. The general model for a respective agent may be represented as:

$$\min_{v_i^t} \sum_{t=1}^{T} f_i^t(v_i^t)$$

such that $$L_i \leq v_i^t \leq U_i, \forall \in \{1, \ldots T\}, \frac{|v_i^{t+1} - v_i^t|}{v_i^t} \leq \tau,$$

$$\forall t \in \{1, \ldots, T\}, \text{ and } v_i^t \in \mathbb{Z}^+, \forall t \in \{1, \ldots, T\},$$

where the decision variables, parameters, and constraint sets are defined below.

$$v_i^t$$

represents the total volume wat can be delivered by agent i at time t (e.g., public decision variable). The parameters may include $U_1$ representing the upper bound of the under the roof volume in a local coordinator (e.g., determined based on the historical data for a past time period, where $U_1 = \max_{t > T-time\ period}\{\text{Volume}\}$), $L_1$ represents the lower bound for the under the roof volume in the local coordinator (e.g., determined based on the historical data for a past time period, where $U_1 = \min_{t > T-time\ period}\{\text{Volume}\}$, and $\tau$ is the threshold to control maximum fluctuations in volume for agent i from time t to time t+1.

The objective function of an agent is the realized cost by the agent, and is a function of volume. The following assumptions may be made for the cost functions: (1) The function parameters may vary across different local coordinators depending on factors such as access to labor, the location of the local coordinator, etc.; (2) the cost function may vary depending on time of year (e.g., peak versus non-peak); (3) historical data support the assumption of a monotonically increasing concave cost function for under the roof and on the road agents, and for grid, the cost function may be uniform until a certain threshold, after which the threshold price may increase with a sharper slope, and (4), the cost rate for the third-party 226 carrier remains constant.

The constraint $$L_i \leq v_i^t \leq U_i, \forall \in \{1, \ldots, T\}$$

sets upper and lower bounds for the planned volume of agent i. Constraint $$\frac{|v_i^{t+1} - v_i^t|}{v_i^t} \leq \tau, \forall t \in \{1, \ldots, T\}$$

controls the volume fluctuations for the agent from time t to time t+1, which cannot exceed τ percent of the volume at time t.

Agent A4 representing the third-party 226 may be represented as $$\min_{v_i^t} \sum_{t=1}^{T} f_4^t(v_4^t) = \sum_{t=1}^{T} v_4^t \times r,$$

where r is the flat rate for a package paid to the third-party 226 for using it.

Table 1 below provides example parameters that may be used:

| Parameter |
| --- |
| Under the Roof cost function (variable) |
| Over the road cost function (variable) |
| Grid cost function (variable) |
| ρ: coefficient in augmented Lagrangian (constant) |
| α: coefficient in augmented Lagrangian (constant) |
| T: planning horizon (days) |
| $U_{UTR}$ (packages) |
| $U_{OTR}$ (packages) |
| $U_{Grid}$ (packages) |
| $L_{UTR}$ (packages) |
| $L_{OTR}$ (packages) |
| $L_{Grid}$ (packages) |

In this manner, the parameters of Table 1 may be given other values to determine the planned volume of deliveries for respective agents on various dates and times. Using one or more iterations until a volume convergence is reached for the agents, the central coordinator 102 may generate the consensus volume of deliveries for the agents, which may be different than the volumes of the models (e.g., cost functions) of the respective agents (e.g., represented by the respective computer code of the models). The multi-level hierarchical approach enables accurate modeling of the nature of operations within and between delivery stations. Each station (e.g., the coordinator of the station) identifies the optimum volume that can be delivered at the station level, including by the third-party 226 carriers. Once the lower level models are solved at the station level, the results are sent to the central coordinator 102 at the network level, where the central coordinator 102 may solve the consensus planning model for the entire network (e.g., the structure 200) pass the results the individual stations in the lower level model. The message passing between the upper level central coordinator 102 and the stations, and between the agents of each station, may be iterated until a network level equilibrium (e.g., convergence) is reached. In particular, the results may be stored in the scalable object storage 110 and the scalable object storage 112, for example, and the central coordinator 102 may use them in the batch computing 114, the batch computing 116, and/or the batch computing 118 to determine the consensus using one or multiple iterations as described above.

Figure 4:
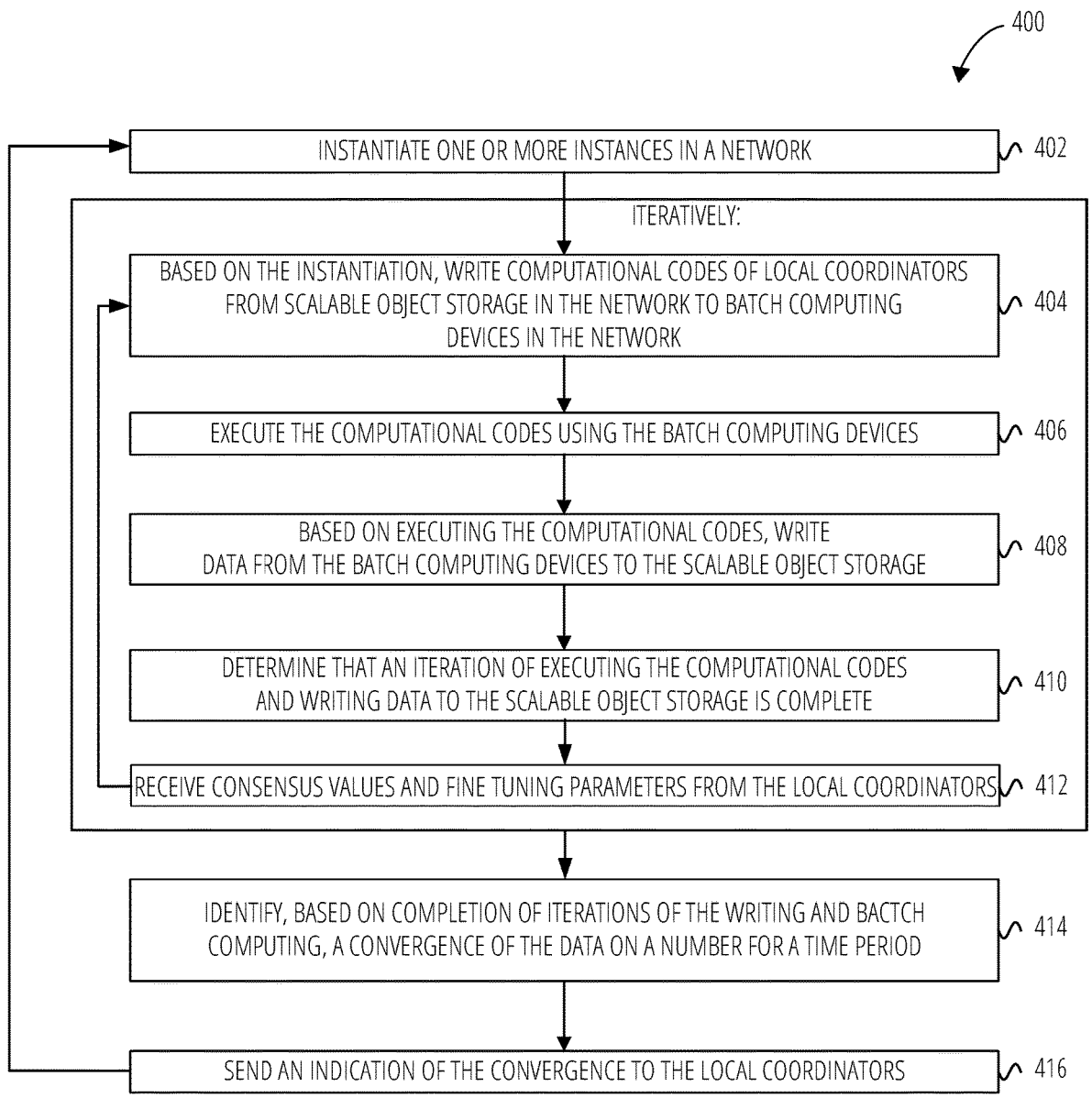
FIG. 4 illustrates an example process for consensus planning using the batch computing architecture of FIG. 1 aspect of the subject matter in accordance with one or more embodiments of the present disclosure.

FIG. 4 illustrates an example process 400 for consensus planning using the batch computing architecture of FIG. 1 aspect of the subject matter in accordance with one or more embodiments of the present disclosure.

At block 402, a device (or system, e.g., the central coordinator 102 of FIG. 1) may instantiate (e.g., using one or more instances) in a network (e.g., a cloud-based network with batch computing capabilities).

At block 404, the device may, based on the instantiation, write computations codes of local coordinators (e.g., the coordinator 208, the coordinator 210, the coordinator 212 of FIG. 2) from scalable object storage (e.g., the scalable object storage 110, the scalable object storage 112 of FIG. 1) to batch computing devices (e.g., the batch computing 114, the batch computing 116, the batch computing 118 of FIG. 1) in the network. The computational codes may be different for respective agents/sub-agents of the local coordinators, with different parameters and different problems to solve.

At block 406, the device may execute the computational codes using the batch computing devices (e.g., as described above). At block 408, the device may, based on the batch computing execution, write data (e.g., public variables) from the batch computing devices to the scalable object storage. In this manner, in a given iteration of blocks 404-406, the respective computational codes may be run in parallel using the batch computing to determine a consensus value of local coordinators. At block 410, an iteration of blocks 404-406 may be complete, and the device may send the consensus value to the local coordinators. At block 412, the device may receive updated consensus values and fine tuning parameters from the respective local coordinators, which may be used in a subsequent iteration. In this manner, a single iteration may include blocks 404-412, and multiple iterations may be performed until a convergence on the data from the batch computing execution of the computational codes is reached at block 414. For example, when the consensus planning is for delivery station volume, the convergence may represent an agreed upon delivery volume for the stations of the local coordinators.

At block 416, the device may send an indication of the convergence value to the local coordinators to be implemented by the agents of the local coordinators.

Figure 5:
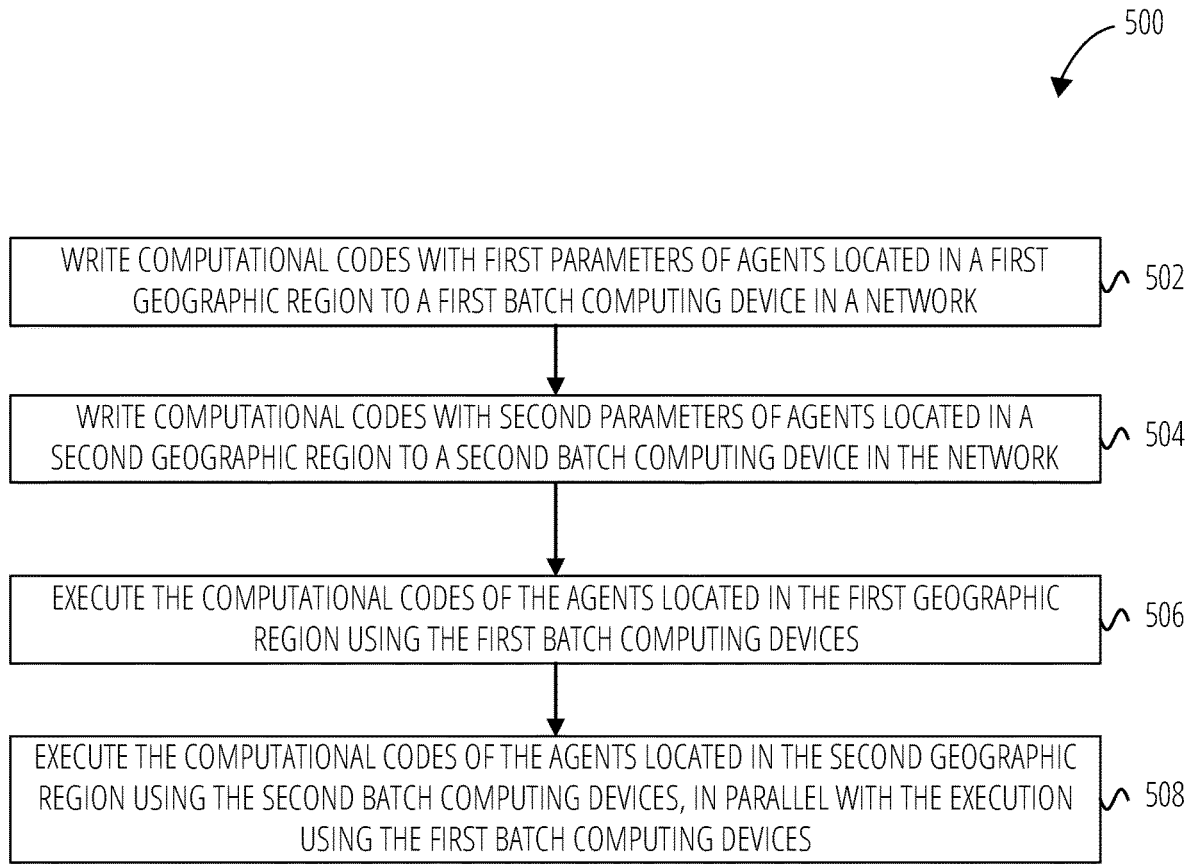
FIG. 5 illustrates an example process of the batch computing for the process of FIG. 4 in accordance with one or more embodiments of the present disclosure.

FIG. 5 illustrates an example process 500 of the batch computing for the process 400 of FIG. 4 in accordance with one or more embodiments of the present disclosure.

It should be noted that the steps of the process 500 may occur in parallel. For example, the device (or system, e.g., the central coordinator 102 of FIG. 1) may write computational codes with first parameters of agents located in a first geographic region to a first batch computing device at block 502. In parallel with block 504, the device may write computational codes with second parameters of agents located in a second geographic region to a second batch computing device in the network. In this manner, the same or different computational codes with different parameters of the agents in different locations may be grouped in clustered batch computing for parallel computation. At block 506, the first batch computing devices may execute the computational codes of the agents in the first geographic region. In parallel with block 506, block 508 may include the device executing the computational codes of the agents located in the second geographic region using the second batch computing devices.

Figure 6:
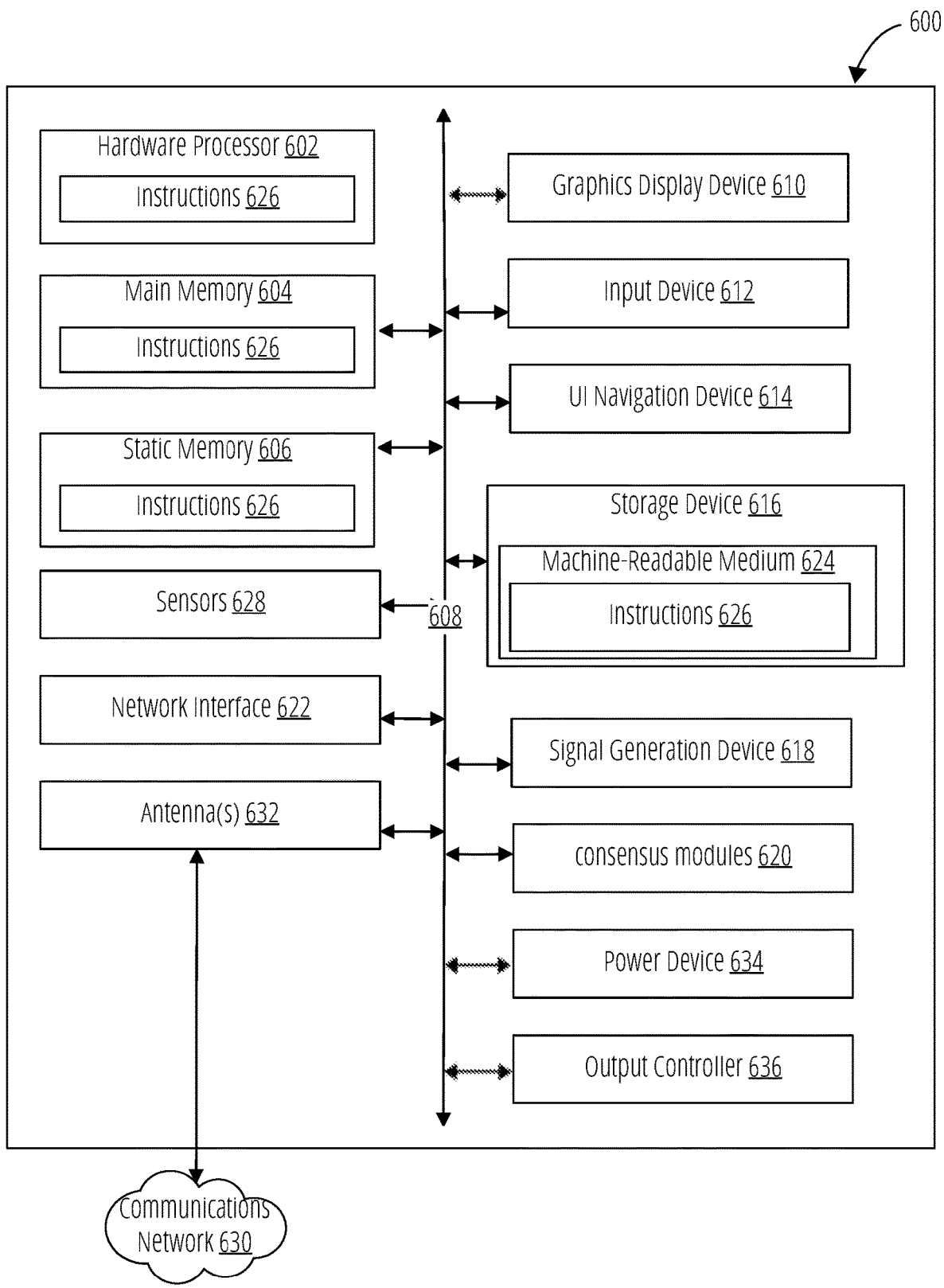
FIG. 6 illustrates a block diagram of an example machine upon which any of one or more techniques (e.g., methods) may be performed, in accordance with one or more example embodiments of the present disclosure.

FIG. 6 illustrates a block diagram of an example machine upon which any of one or more techniques (e.g., methods) may be performed, in accordance with one or more example embodiments of the present disclosure.

In other embodiments, the machine 600 may operate as a standalone device or may be connected (e.g., networked) to other machines. In a networked deployment, the machine 600 may operate in the capacity of a server machine, a client machine, or both in server-client network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuration may occur under the direction of the execution units or a loading mechanism. Accordingly, the execution units are communicatively coupled to the computer-readable medium when the device is operating. In this example, the execution units may be members of more than one module. For example, under operation, the execution units may be configured by a first set of instructions to implement a first module at one point in time and reconfigured by a second set of instructions to implement a second module at a second point in time.

The machine 600 (e.g., computer system) may include a hardware processor 602 (e.g., a central processing unit (CPU), a graphics processing unit (GPU), a hardware processor core, or any combination thereof), a tensor processing unit (TPU), a main memory 604 and a static memory 606, some or all of which may communicate with each other via an interlink (e.g., bus 608). The machine 600 may further include a power device 634, a graphics display device 610, an input device 612 (e.g., a keyboard), and a user interface UI navigation device 614 (e.g., a mouse). In an example, the graphics display device 610, input device 612, and UI navigation device 614 may be a touch screen display. The machine 600 may additionally include a storage device 616, a signal generation device 618, one or more audio and video modules 620 (e.g., representing any combination of the architecture 100, the structure 200, the structure 300, and capable of performing steps according to FIGS. 1-5), a network interface 622 coupled to antenna(s) 632, and one or more sensors 628. The machine 600 may include an output controller 636, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine-readable medium 624 on which is stored one or more sets of data structures or instructions 626 (e.g., software) embodying or utilized by any one or more of the techniques or functions described herein. The instructions 626 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 624 is illustrated as a single medium, the term "machine-readable medium" may include a single medium or multiple media (e.g., a centralized or distributed database, and/or associated caches and servers) configured to store the one or more instructions 626.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices;

magnetic disks, such as internal hard disks and removable disks; magneto-optical disks; and CD-ROM and DVD-ROM disks.

The instructions 626 may further be transmitted or received over a communications network 630 using a transmission medium via the network interface 622 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface 622 may include one or more physical jacks (e.g., Ethernet, coaxial, or phone jacks) or one or more antennas to connect to the communications network 630. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for supply chain consensus planning using batch computing architecture, the method comprising:
   instantiating an elastic computing instance in a network;
   based on the instantiation of the elastic computing instance, writing computational codes of delivery station agents of a supply chain from scalable object storage in the network to batch computing devices in the network;
   (i) executing the computational codes, independently from one another, by:
   writing the computational codes, using first parameters, of first agents to a first batch computing device of the batch computing devices; and
   writing the computational codes, using second parameters, of second agents to a second batch computing device of the batch computing devices, wherein the first batch computing device is dedicated to the first agents and the second batch computing device is dedicated to the second agents;
   (ii) based on executing the computational codes, writing delivery volume data, by the delivery station agents independently from one another, from the batch computing devices to the scalable object storage;

(iii) determining, by the elastic computing instance, that an iteration of executing the computational codes and writing the delivery volume data to the scalable object storage is complete;

(iv) sending, by the elastic computing instance, to the delivery station agents, a first number of deliveries for a time period, the first number of deliveries based on the executing of the computational codes;

(v) identifying, by the elastic computing instance, updated delivery volume data received from the delivery station agents;

(vi) iteratively repeating, by the elastic computing instance, steps (i)-(v) until identifying, by the elastic computing instance, a convergence of the delivery volume data on a second number of deliveries for the time period, the convergence indicative of a consensus; and sending, by the elastic computing instance, an indication of the convergence to the delivery station agents.

2. The method of claim 1, wherein the first agents are located in a first geographic region, the second agents are located in a second geographic region, and wherein the first batch computing device is used for the first geographic region and not the second geographic region, and wherein the second batch computing device is used for the second geographic region and not the first geographic region.

3. The method of claim 1, further comprising:

executing a function configured to submit batch computing jobs on a delivery station-by-delivery station basis, wherein delivery stations of the supply chain comprise the delivery station agents.

4. The method of claim 1, wherein the first agents are associated with first computational codes of the computational codes, and wherein the second agents are associated with second computational codes of the computational codes.

5. A method for supply chain consensus planning using batch computing architecture, the method comprising:

instantiating an instance in a network;

based on the instantiation of the instance, writing computational codes of local coordinators from scalable object storage in the network to batch computing devices in the network;

(i) executing the computational codes, independently from one another, by:

writing the computational codes, using first parameters, of first agents to a first batch computing device of the batch computing devices; and writing the computational codes, using second parameters, of second agents to a second batch computing device of the batch computing devices, wherein the first batch computing device is dedicated to the first agents and the second batch computing device is dedicated to the second agents;

(ii) based on executing the computational codes, writing first public variables, by the local coordinators independently from one another, from the batch computing devices to the scalable object storage;

(iii) identifying, by the instance, based on the first public variables, a first quantity for a time period; and sending, by the instance, an indication of the first quantity to the local coordinators.

6. The method of claim 5, further comprising:

(iv) sending, to the local coordinators, the first quantity for a time period, the first quantity based on the executing of the computational codes;

(v) identifying updated variables received from the local coordinators;

(vi) iteratively repeating steps (i)-(v) until identifying a convergence of the first public variables on a second quantity for the time period, the convergence indicative of a consensus; and sending an indication of the convergence to the local coordinators.

7. The method of claim 6, wherein the second quantity is a number of deliveries.

8. The method of claim 7, wherein the consensus is based on a minimum delivery cost of delivery station agents of the local coordinators.

9. The method of claim 5, wherein the instance is an elastic computing instance.

10. The method of claim 5, wherein the instance is an event-driven serverless computing instance.

11. The method of claim 5, wherein instantiating the instance comprises deploying a machine learning model with which to write to the scalable object storage using the computational codes.

12. The method of claim 5, wherein the first agents are located in a first geographic region, the second agents are located in a second geographic region, and wherein the first batch computing device is used for the first geographic region and not the second geographic region, and wherein the second batch computing device is used for the second geographic region and not the first geographic region.

13. The method of claim 5, further comprising:

executing a function configured to submit batch computing jobs on a delivery station-by-delivery station basis, wherein delivery stations of a supply chain comprise the local coordinators.

14. The method of claim 5, wherein the local coordinators comprise the first agents of a first delivery station of a supply chain network and the second agents of a second delivery station of the supply chain network, wherein the first agents are associated with first computational codes of the computational codes, and wherein the second agents are associated with second computational codes of the computational codes.

15. The method of claim 14, wherein the first agents comprise a first third-party delivery agent and the second agents comprise a second third-party delivery agent.

16. The method of claim 5, wherein identifying the first quantity is based on a Lagrangian of variables of the computational codes.

17. A system for supply chain consensus planning using batch computing architecture, the system comprising:

scalable object storage;

batch computing devices; and one or more instances configured to:

instantiate in a network;

based on the instantiation of the instance, write computational codes of local coordinators from the scalable object storage to the batch computing devices;

(i) execute the computational codes, independently from one another, by:

writing the computational codes, using first parameters, of first agents to a first batch computing device of the batch computing devices; and writing the computational codes, using second parameters, of second agents to a second batch computing device of the batch computing devices, wherein the first batch computing device is dedicated to the first agents and the second batch computing device is dedicated to the second agents;

(ii) based on executing the computational codes, write first public variables, by the local coordinators independently from one another, from the batch computing devices to the scalable object storage;

(iii) identify, based on the first public variables, a first quantity for a time period; and send an indication of the first quantity to the local coordinators.

18. The system of claim 17, wherein the one or more instances are further configured to:

(iv) send, to the local coordinators, the first quantity for a time period, the first quantity based on the executing of the computational codes;

(v) identify updated variables received from the local coordinators;

(vi) iteratively repeat steps (i)-(v) until identifying a convergence of the first public variables on a second quantity for the time period, the convergence indicative of a consensus; and send an indication of the convergence to the local coordinators.

19. The system of claim 18, wherein the second quantity is a number of deliveries.

20. The system of claim 17, wherein the one or more instances are elastic computing instances.

* * * * *